US010069786B2

(12) United States Patent
Paul et al.

(10) Patent No.: US 10,069,786 B2
(45) Date of Patent: *Sep. 4, 2018

(54) EMAIL QUOTA MANAGEMENT SYSTEM

(71) Applicant: INTERNATIONAL BUSINESS MACHINES CORPORATION, Armonk, NY (US)

(72) Inventors: Bhavana Paul, Pune (IN); Snehal S. Devasthali, Pune (IN); Prasad P. Purandare, Pune (IN); Priyanka Sharma, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,255

(22) Filed: Feb. 1, 2018

(65) Prior Publication Data

US 2018/0139169 A1    May 17, 2018

Related U.S. Application Data

(63) Continuation of application No. 15/664,354, filed on Jul. 31, 2017, now Pat. No. 9,917,809, which is a continuation of application No. 15/178,604, filed on Jun. 10, 2016.

(51) Int. Cl.
    *H04L 12/58*    (2006.01)
(52) U.S. Cl.
    CPC .............. *H04L 51/36* (2013.01); *H04L 51/22* (2013.01)
(58) Field of Classification Search
    CPC ....... G06Q 10/107; G06Q 10/10; H04L 51/34
    See application file for complete search history.

(56) References Cited

U.S. PATENT DOCUMENTS

| 6,684,238 | B1 | 1/2004 | Dutta |
| 7,499,975 | B1 | 3/2009 | Bombacino et al. |
| 8,280,965 | B2 | 10/2012 | DellaFera et al. |
| 8,909,714 | B2 | 12/2014 | Agarwal et al. |
| 9,083,558 | B2 | 7/2015 | Deluca et al. |
| 9,282,184 | B2 | 3/2016 | Burckart et al. |
| 2004/0243679 | A1 | 12/2004 | Tyler |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Ranodhi Serrao
(74) *Attorney, Agent, or Firm* — Samuel A. Waldbaum

(57) ABSTRACT

A computer receives an out of office status a user has indicated on an email application, the email application using a communications network and determines a quota status of the user based on a previous quota usage pattern and a current quota usage pattern, wherein the quota includes an amount of storage spaced allotted to the user. The computer receives a new email to be delivered to the user and assigns a quota status to the new email. In response to the assigned quota status, the computer determines when the new email should be delivered to the email application of the user. As soon as the sender enters the name(s) of the recipients, the quota usage monitoring engine retrieves the quota status information from the recipients mail box. The engine determines if the new email should be sent out from the senders outbox and dropped to recipients mail box.

1 Claim, 6 Drawing Sheets

(56) References Cited

U.S. PATENT DOCUMENTS

| | | |
|---|---|---|
| 2008/0104177 A1 | 5/2008 | Keohane et al. |
| 2009/0037532 A1 | 2/2009 | Estrada |
| 2010/0017194 A1 | 1/2010 | Hammer et al. |
| 2010/0017484 A1 | 1/2010 | Accapadi et al. |
| 2010/0169264 A1 | 7/2010 | O'Sullivan et al. |
| 2010/0211592 A1 | 8/2010 | Brownlee |
| 2010/0235447 A1 | 9/2010 | Goodman et al. |
| 2010/0250682 A1 | 9/2010 | Goldberg et al. |
| 2010/0332428 A1 | 12/2010 | McHenry et al. |
| 2011/0161437 A1 | 6/2011 | Cox et al. |
| 2012/0084375 A1 | 4/2012 | Haskins et al. |
| 2014/0280616 A1 | 9/2014 | Ramanathan et al. |
| 2015/0301903 A1 | 10/2015 | Mutha et al. |
| 2017/0359297 A1 | 12/2017 | Paul et al. |
| 2017/0359299 A1 | 12/2017 | Paul et al. |

OTHER PUBLICATIONS

IBM: List of IBM Patents or Patent Applications Treated as Related (Appendix P), Feb. 12, 2018, pp. 1-2.

U.S. Appl. No. 15/887,048, filed Feb. 2, 2018, entitled: "Email Quota Management System", pp. 1-31.

EMAIL QUOTA MANAGEMENT SYSTEM

BACKGROUND

The present invention relates generally to the field of data processing for transferring data between a plurality of computers, and more particularly to transferring electronic mail messaging (Email).

A common problem of a quota for electronic messages becoming overbooked and messages being retuned or bounced, involves when a user is on vacation and sets an automatic response for electronic messages. In one example, a quota refers to an email quota, for example, a user mail file usually has a definite quota allocated. This allows the user to keep and/or receive only a specific amount of data in their mail file on the server copy of the mail file. Some solutions to this problem suggest that a user can set which emails they would like to receive during their absence. The user has control over that area of their email and can opt for setting a criteria list which would allow accepting emails from specific people. However, this does not provided precise enough control, such that, some emails the user might want are not received or quota space is not correctly allocated which could lead to missing needed or wanted emails.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for an electronic mail messaging system. A computer receives an out of office status a user has indicated on an email application, the email application using a communications network and determines a quota status of the user based on a previous quota usage and a current quota usage, wherein the quota includes an amount of storage spaced allotted to the user. The computer receives a new email to be delivered to the user and assigns a quota status to the new email. In response to the assigned quota status, the computer determines when the new email should be delivered to the email application of the user.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
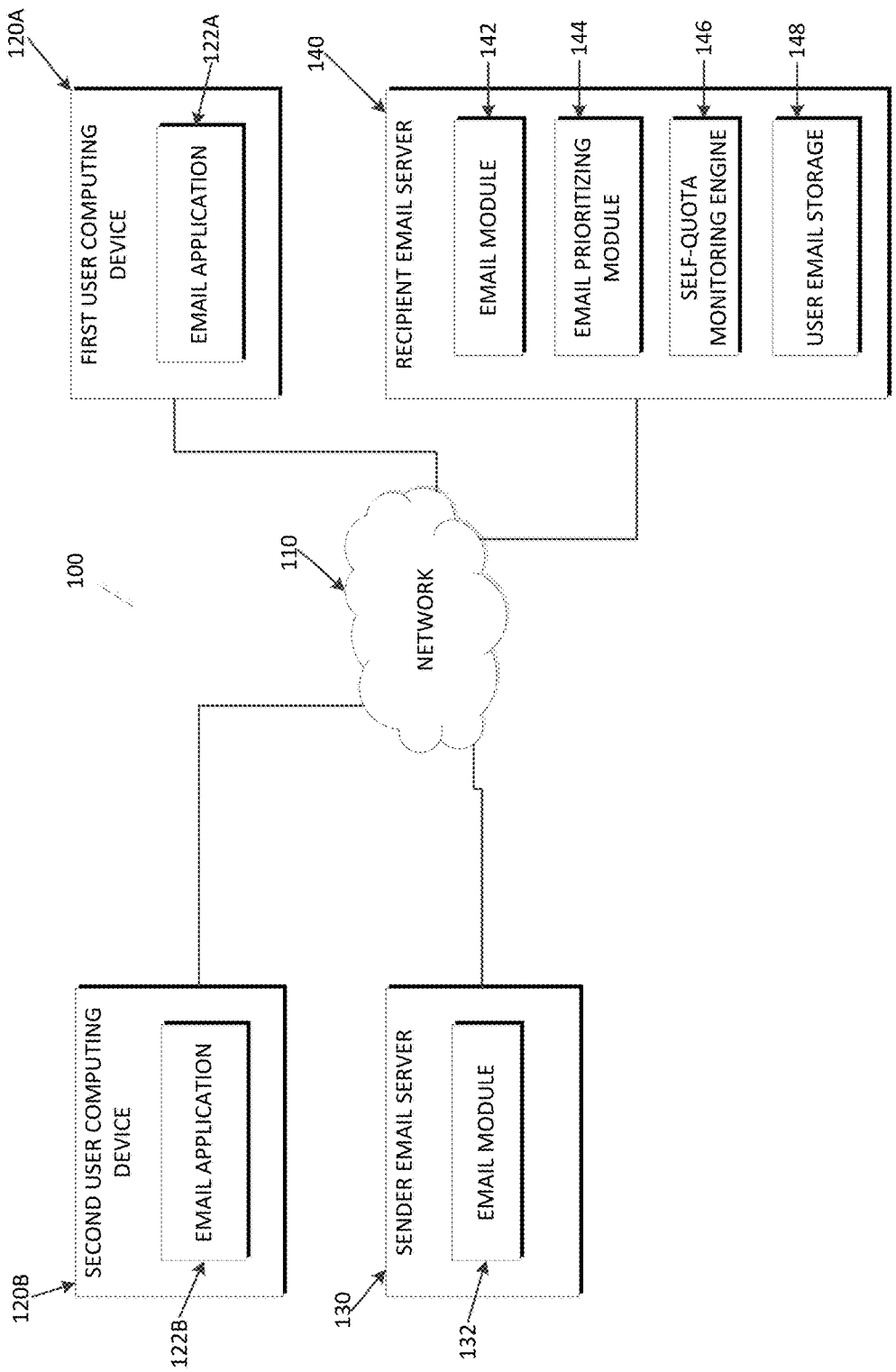
FIG. 1 is a functional block diagram illustrating an electronic mail messaging system, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for managing a quota allotment for a user. Quota here is referred to an email quota, for example, a user mail file usually has a definite quota or specific amount of storage allocated to each file. This allows the user to keep and/or receive only specific amount of data in his/her email file on the server copy of the email file. The user indicates in the email application that away status which causes the email prioritizing module to determine the priority rules as to which of the incoming emails that user might need right away. The self-quota monitoring engine reviews previous quota usage of the user during previous times the user has established an away status. When the email module of the recipient email server receives a new email for a user that has indicated an away status the email prioritizing module assigns a priority, or a priority level, to the incoming email based on the established priority rules. The self-quota monitoring engine determines if the email should be delivered to the user or should it be marked as an outstanding email based on the past and present quota usage for the user. The email module delivers the emails that have been deemed a priority and the user quota allows for the delivery of these emails. Once the user has changed his status from no longer being away, then the email module delivers the outstanding emails based on priority and quota space.

FIG. 1 is a functional block diagram illustrating an electronic mail messaging system 100, in accordance with an embodiment of the present invention. The electronic mail messaging system 100 includes a first user computing device 120A, a recipient email server 140, a second user computing device 120B, and a sender email server 130, communicating via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 120A, 120B, the sender email server 130, and the recipient email server 150, in accordance with one or more embodiments of the invention.

The user computing devices 120A and 120B represents a computing device that includes a user interface, for example, a graphical user interface part of email application 122A, 122B that allows write and receive emails. The email application 122A, 122B represents one or more user interfaces for sending and receiving emails. The email applications 122A, 122B allow a user to change their status, for example, changing their status to away or available. Email applications 122A, 122B may be, for example, a web browser, an application, or other types of email applications for sending and/or receiving emails, via the network 110.

The user computing devices 120A and 120B may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120A and 120B may include internal and external hardware components, as described in further detail below with respect to FIG. 3. In other embodiments, the user computing device 120A and 120B may operate in a cloud computing environment, as described in further detail below with respect to FIGS. 4 and 5.

The sender email server 130 and the recipient email server 140 comprise the same functional components, in accordance with an embodiment of the present invention. The present invention is able to be practice by one or more email servers and for simplicity the invention is describe using a sender email server 130 and the recipient email server 140. The sender email server 130 and the recipient email server 140 both send and receive emails to user connected to the email server, respectively. The sender email server 130 includes an email module 132. The sender email server 130 may include internal and external hardware components, as described in further detail below with respect to FIG. 3. In other embodiments, the sender email server 130 may operate in a cloud computing environment, as described in further detail below with respect to FIGS. 4 and 5.

The email module 132 receives the outgoing emails from the email application 122B of the second user computing device 120B. The email module 132 transmits the outgoing email to the email module 142 of the recipient email server 140. If the outgoing email (which is referred to as a new incoming email from the perspective of the recipient email server 140), is deemed to be an outstanding email by the email prioritizing module 144 and the self-quota monitoring engine 146, which will be described in detail below, then the email module 132 will hold the outgoing email in an outgoing box (not shown) until the recipient email server 140 indicates that it can receive the outgoing email.

The recipient email server 140 receives the incoming emails from the sender email server 130 and transmits the incoming emails to the email application 122A of the first user computing device 120A. The recipient email server 140 includes an email module 142, an email prioritizing module 144, a self-quota monitoring engine 146, and user email storage 148. The recipient email server 140 may include internal and external hardware components, as described in further detail below with respect to FIG. 3. In other embodiments, the recipient email server 140 may operate in a cloud computing environment, as described in further detail below with respect to FIGS. 4 and 5.

The user email storage 148 is a data store to store emails sent/received by a user computing device. Each user is allotted a specific amount of storage space or quota to keep and/or receive only specific amount of data in his/her mail file on the server copy of the mail file. This allotted of storage space is referred to as the quota which is associated with each user.

The email module 142 sends/receives from/to the email application 122A on the first user computing device 120A. The email module 142 receives the incoming emails from the email module 132 of the sender email server 130. The email module 142 transmits the incoming email to the email application 122A of the first user computing device 120A. When a user changes his/her status, for example changing to an away status or changing to an available status, the email module 142 attaches a current status flag to the metadata information of the recipients email identification. When the status is changed to an away status then the email module 142 transmits the change of status to the email prioritizing module 144 and the self-quota monitoring engine 146. The email module 142 receives all incoming emails and sends notification to the email prioritizing module 144 and the self-quota monitoring engine 146 that new mail has arrived.

The email prioritizing module 144 establish a priority rules that are applied to all incoming emails. The email prioritizing module 144 establishes the priority rules by reviewing a user email past history, current user email trends, subject matter of the incoming emails, an identification of the sender of the emails, current business needs and/or other elements the might help. Once the priority rules are established, the email prioritizing module 144 assigns a priority to the incoming emails.

The self-quota monitoring engine 146 monitors a user quota usage while the user has an away status. The self-quota monitoring engine 146 determines quota status by reviewing the user previous quota usage, i.e. the previous times the user set an away status and the user current quota usage to determine a current quota status for the user. When a new incoming email has been received by the email module 142 and a priority has been assigned by the email prioritizing module 144, then the self-quota monitoring engine 146 assigns a status to the email based on the determined quota status for the user. The status assigned by the self-quota monitoring engine 146 determines if the email should be forward to the email application 122A on the first user computing device 120A or if the incoming email should be held in the outgoing email box of email module 132 on the sender email server 130. The email module 142 forwards the email to the email application 122A on the first user computing device 120A or has the email module 132 on the sender email server 130 hold the email in its outgoing email outbox. The email that is held in the outgoing email outbox of the email module 132 on the sender email server 130 is considered outstanding email. When incoming emails are forwarded on to the email application 122A causes the self-quota monitoring engine 146 to update the quota status for the user.

When there is no new incoming email to the email module 142 on the recipient email server 140, then the email module 142 determines if any of the outstanding emails should be forward on to the email application 122A, based on the assigned priority to the outstand email and the current quota status for the user determined by the self-quota monitoring engine 146. When the email module 142 forwards an outstanding email on to the email application 122A causes the self-quota monitoring engine 146 to update the quota status for the user.

Figure 2A:
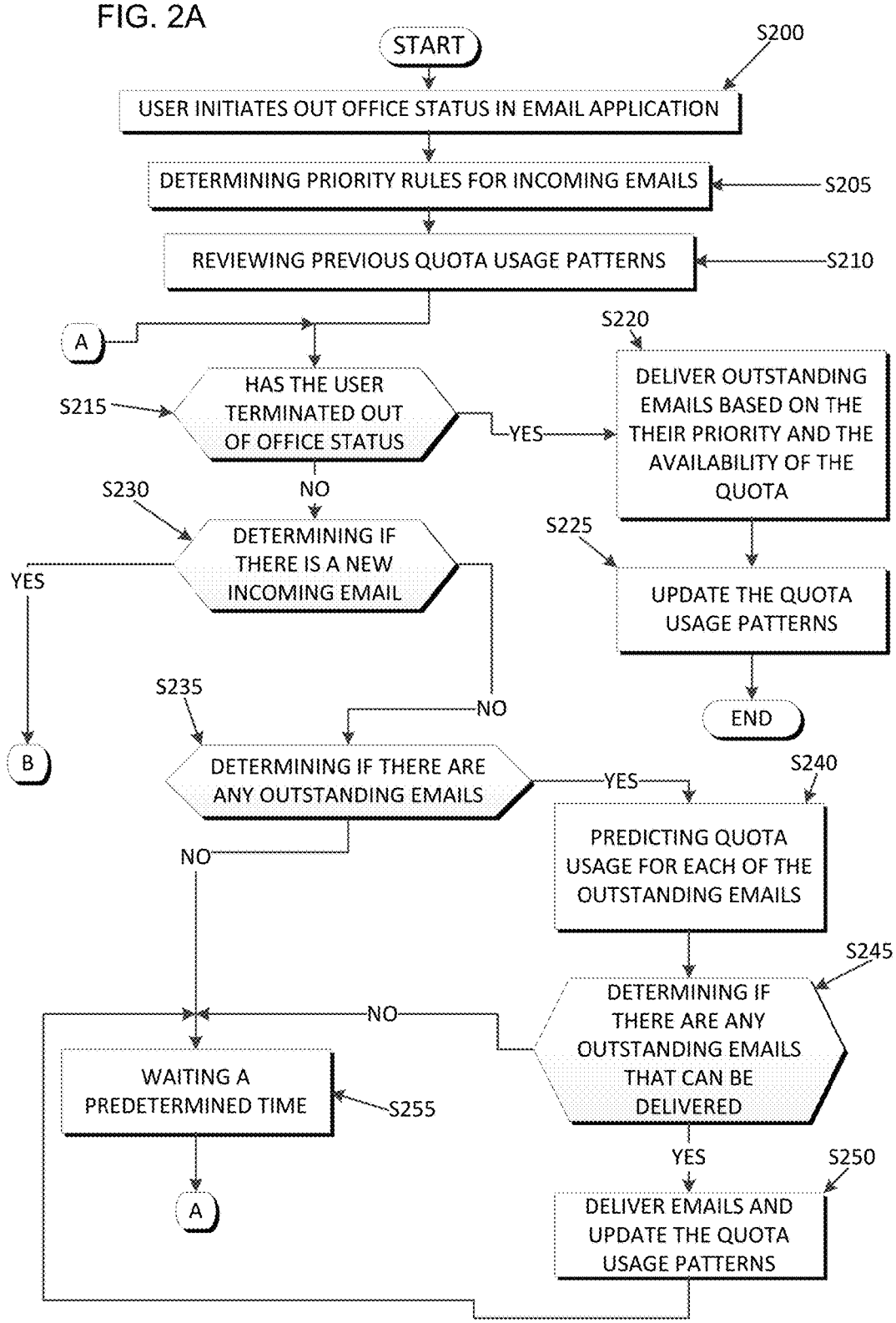
FIGS. 2A and 2B are a flowchart depicting operational steps quota management system within the electronic mail messaging system of FIG. 1, in accordance with an embodiment of the present invention.
Figure 2B:
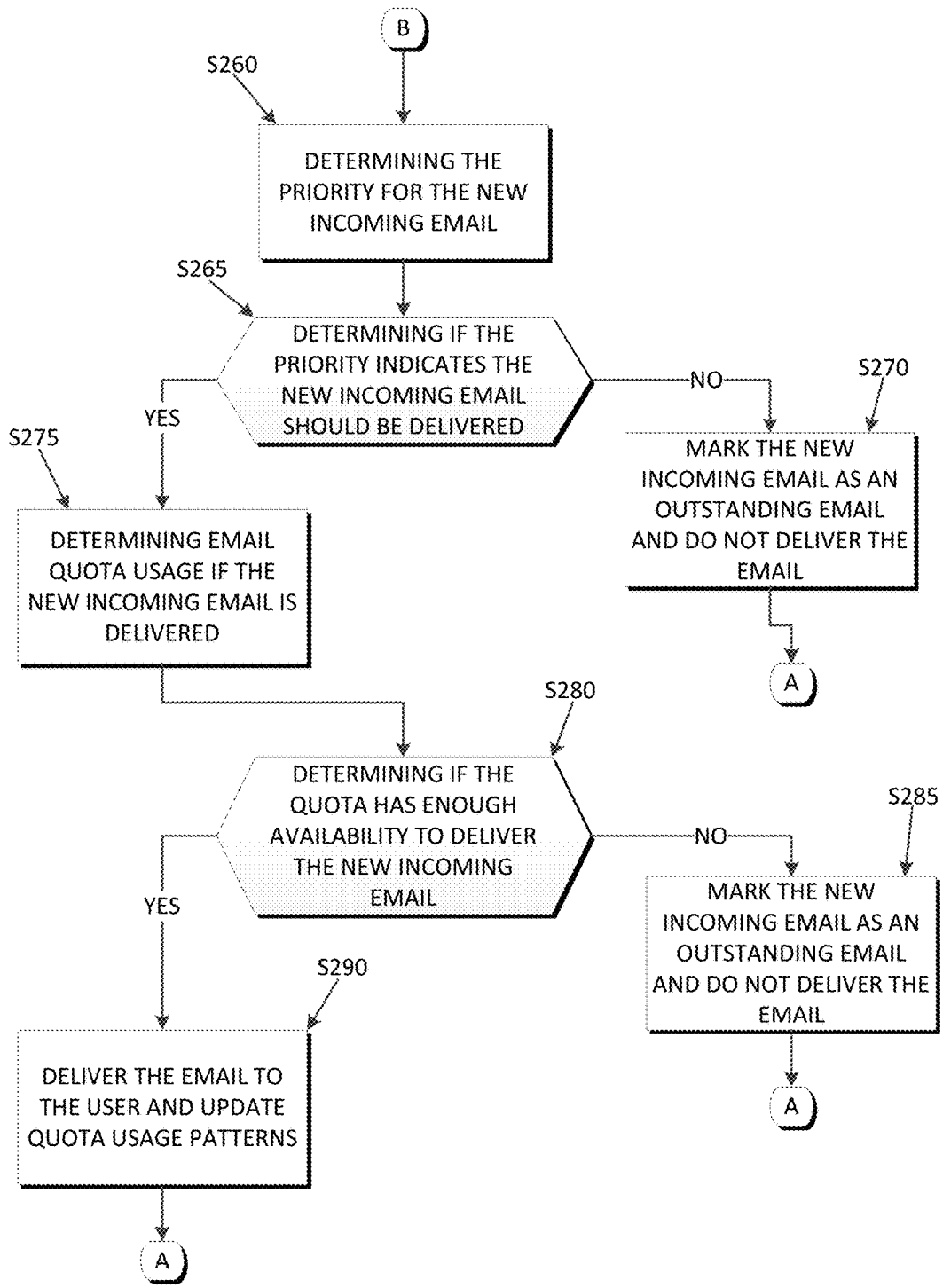

FIGS. 2A and 2B are a flowchart depicting operational steps quota management system within the electronic mail messaging system of FIG. 1, in accordance with an embodiment of the present invention.

The email module 142 receives a user initiated an out office status, that a user has inputted in email application 122A (S200). The email prioritizing module 144 determines the priority rules to be applied to any new incoming email (S205). The self-quota monitoring engine 146 reviews previous quota usage patterns and current quota usage patterns to determine a quota status for the user (S210). The email module 142 determines if the user has terminated his out of office status (S215) and when the user has ended their out of office status then the email module 142 delivers the outstanding emails based on the emails assigned priority and availability of the user quota (S220). Once the outstanding emails have been delivered to the user, then the self-quota monitoring engine 146 updates the user previous quota usage for the next time the user status is changed (S225).

When the email module 142 has determined that the user has not ended his out of office status then the email module 142 determines if there is a new incoming email (S230). When the email module 142 has determined that there are no new incoming emails, then the email module 142 determines if there are any outstanding emails (S235). When there are no outstanding emails then the email module 142 waits for a predetermined time frame (S255) before it repeats the process steps (A). When there are outstanding emails, then the self-quota monitoring engine determines the amount of quota usage for each of the outstanding emails (S240). The email module 142 determines if there are any of outstanding emails can be delivered to the email application 122A of the user based on the outstanding email priority and determined quota usage (S245). When there are no outstanding emails that are currently able to be delivered then the email module 142 waits for a predetermined time frame (S255) before it repeats the process steps (A). When there are outstanding emails to be delivered then the email module 142 forward those emails to the email application of the user 122A and the self-quota monitoring engine updates the user quota usage patterns (S250). After the outstanding emails have been delivered then the email module 142 waits for a predetermined time frame (S255) before it repeats the process steps (A).

FIG. 2B illustrates the steps when the email module 142 determines that there is a new incoming email (S230). The email prioritizing module 144 determines what priority should be assigned to the new incoming email (S260). The email module 142 determines if the assigned priority indicates if the email should be delivered to the user (S265). When the assigned priority does not indicate the new incoming email should be delivered, then the email module 142 marks the email as outstanding, while holding the email in outgoing email outbox in the email module 132 on the sender email server 130 (S270) before it repeats the process steps (A).

When email module 142 determines that the assigned priority to the incoming email indicates that it should be delivered, then the self-quota monitoring engine determines quota usage if the email is delivered and what the current quota status for the user (S275). The self-quota monitoring engine 146 determines if the user quota has enough availability to deliver the new incoming email (S280). When the user does not have enough space in the quota to deliver the new incoming email, then the email module 142 marks the email as outstanding, while holding the email in outgoing email outbox in the email module 132 on the sender email server 130 (S285) before it repeats the process steps (A). When the user does have enough space in the quota to deliver the new incoming email, then the email module 142 sends the email to the email application 122A and the self-quota monitoring engine 146 updates the quota usage patterns (S290), bore it repeats the process steps (A).

Figure 3:
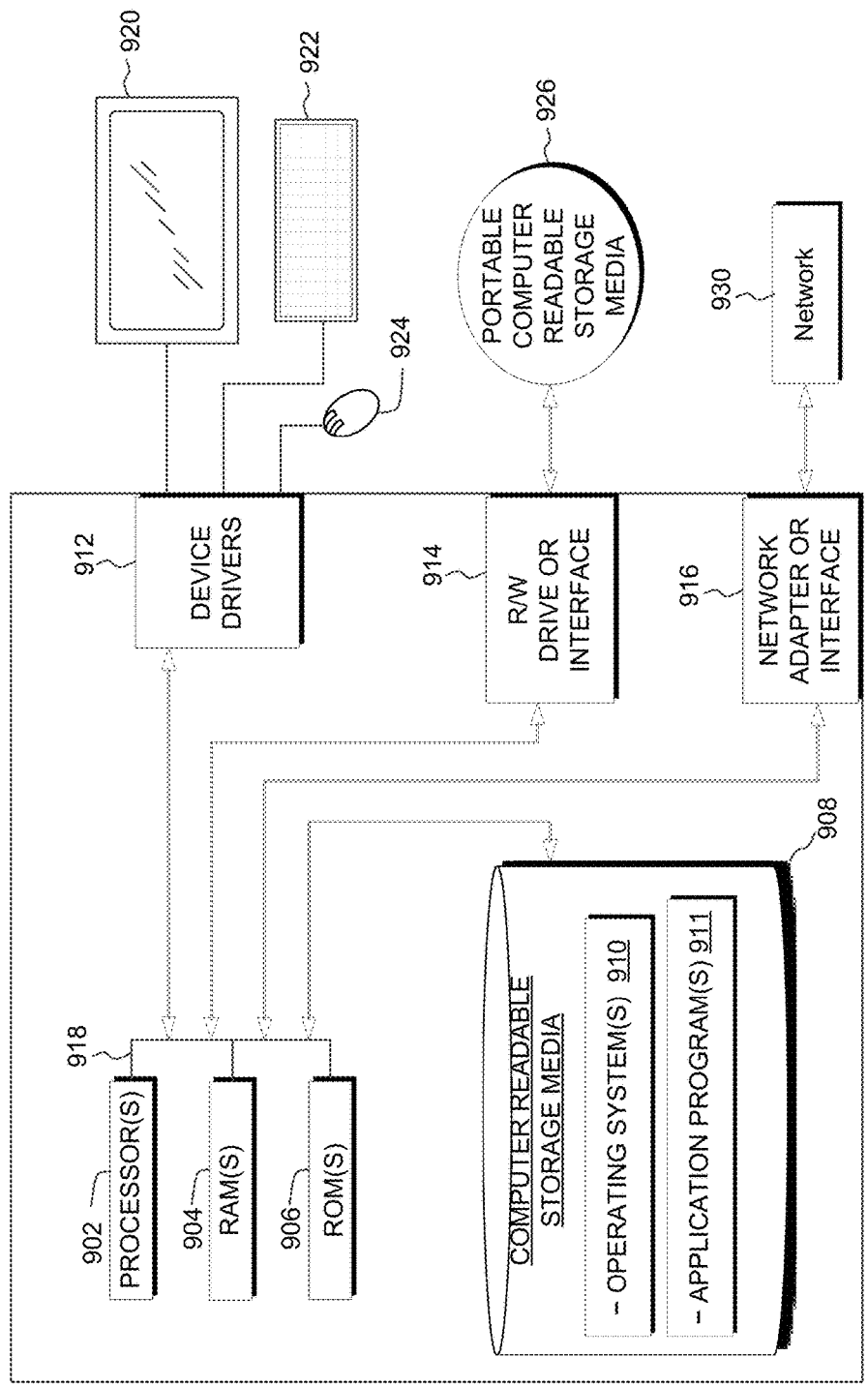
FIG. 3 is a block diagram of components of a computing device of electronic mail messaging system of FIG. 1, in accordance with embodiments of the present invention.
Figure 4:
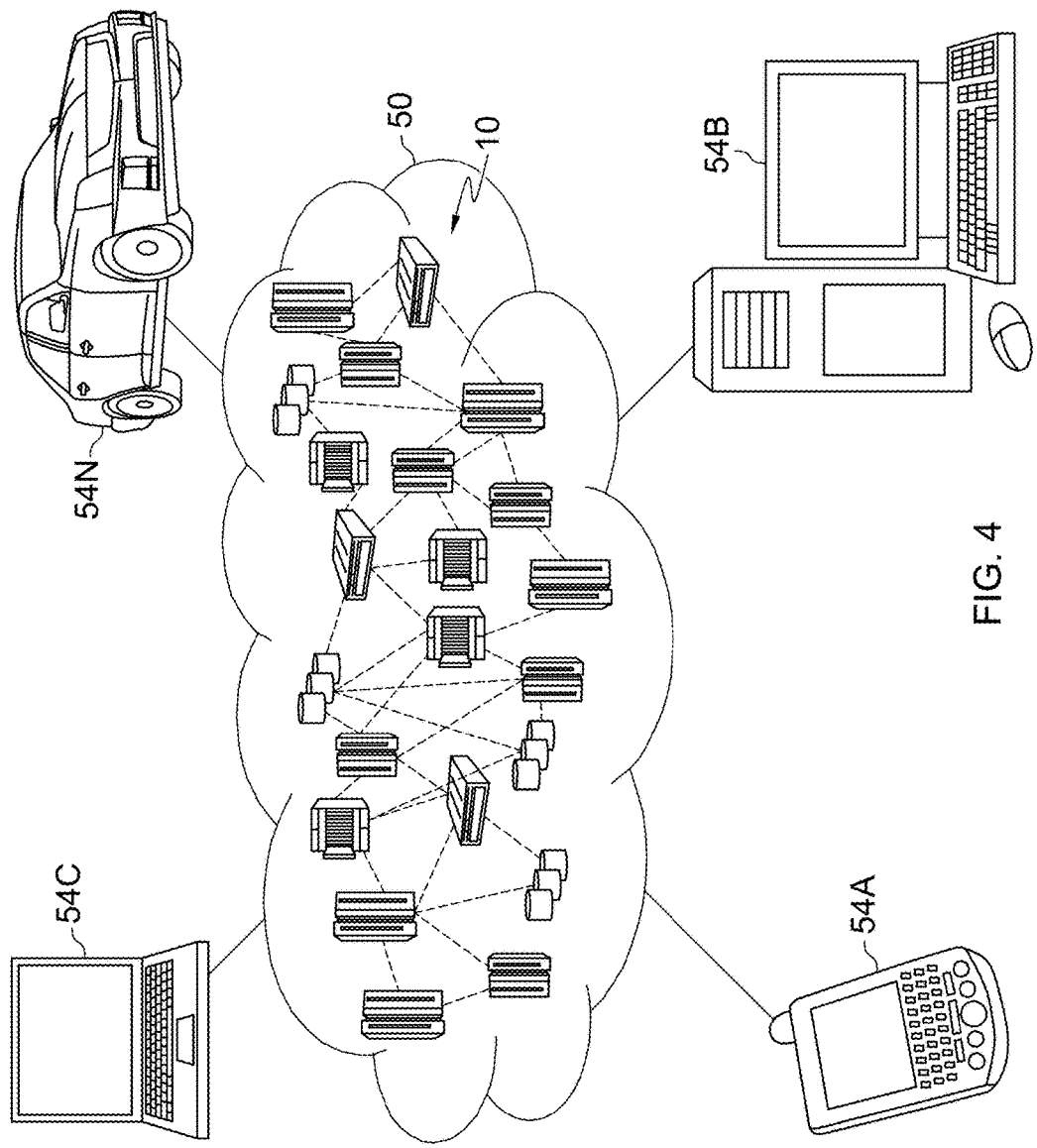
FIG. 4 depicts a cloud computing environment according to an embodiment of the present invention.

FIG. 3 depicts a block diagram of components of the first and second user computing device 120A, 120B, the sender email server 130, and/or the recipient email server 140 of the electronic mail messaging system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The first and second user computing device 120A, 120B, the sender email server 130, and/or the recipient email server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, email prioritizing module 144 and/or self-quota monitoring engine 146 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The first and second user computing device 120A, 120B, the sender email server 130, and/or the recipient email server 140 may also include a R/W drive or interface 914 to read from and write to one or more portable computer readable storage media 926. Application programs 911 on the first and second user computing device 120A, 120B, the sender email server 130, and/or the recipient email server 140 may be stored on one or more of the portable computer readable storage media 926, read via the respective R/W drive or interface 914 and loaded into the respective computer readable storage media 908.

The first and second user computing device 120A, 120B, the sender email server 130, and/or the recipient email server 140 may also include a network adapter or interface 916, such as a TCP/IP adapter card or wireless communication adapter (such as a 4G wireless communication adapter using OFDMA technology). Application programs 911 on the first and second user computing device 120A, 120B, the sender email server 130, and/or the recipient email server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The first and second user computing device 120A, 120B, the sender email server 130, and/or the recipient email server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
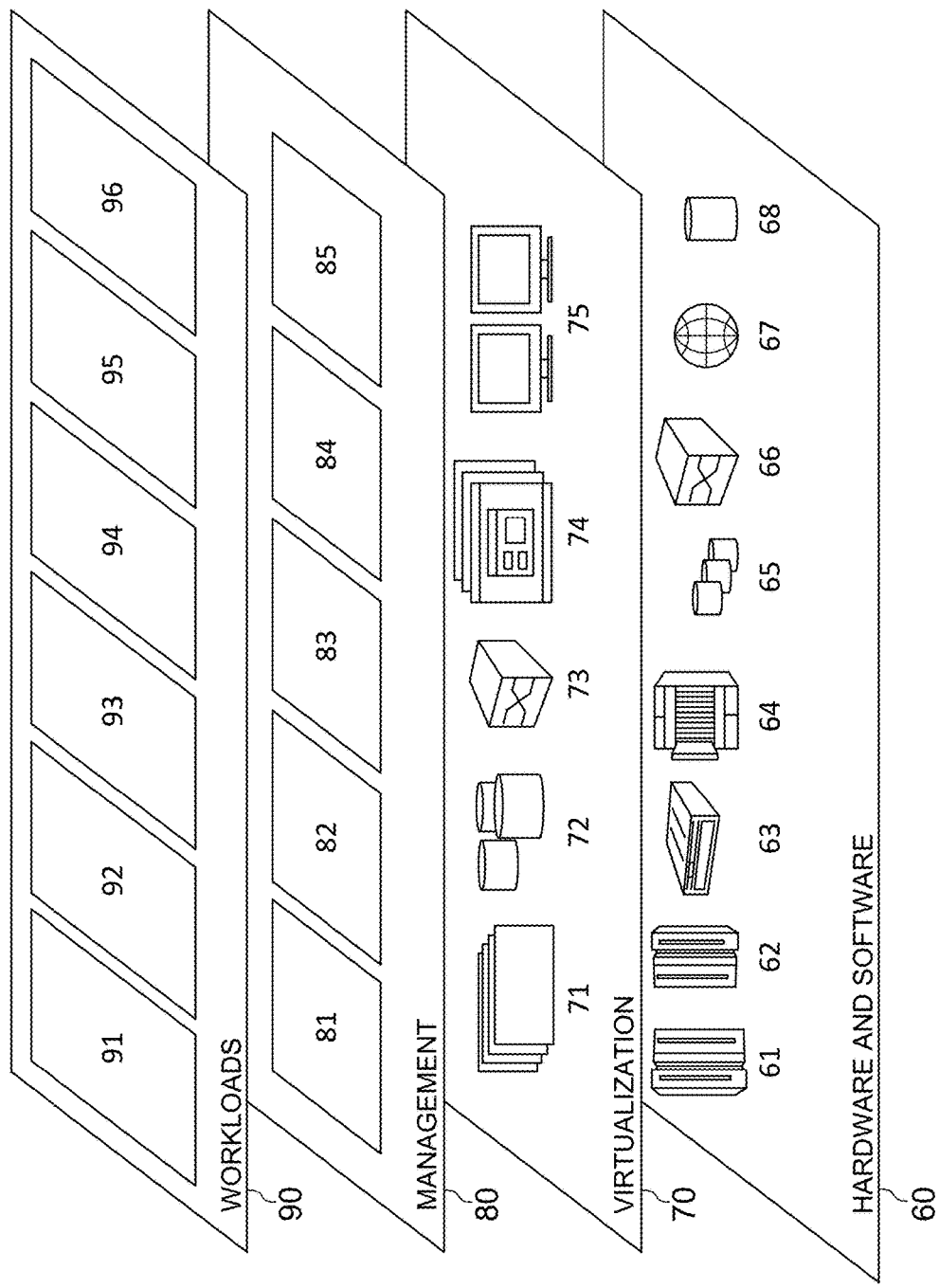
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the electronic mail messaging system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer program product comprising:
   one or more non-transitory computer-readable storage media and program instructions stored on the one or more non-transitory computer-readable storage media, the program instructions comprising:
      program instructions to receive an out of office status a user has indicated on an email application, the email application using a communications network;
      program instructions to determine a quota status of a quota for the user based on a previous quota usage pattern and a current quota usage pattern, wherein the quota includes an amount of storage spaced allotted to the user;
      program instructions to receive a new email to be delivered to the user;
      program instructions to assign a quota status to the new email;
      program instructions to assign priority status to the new email, wherein the priority status is based on at least one of the user email history, the user current email trends, the subject matter of the new email, and/or an identification of the sender of the new email;
      in response to the assigned quota status and the assigned priority, program instructions to determine, that the new email should not be delivered to the email application of the user and marking the new email as an outstanding email;
      program instructions to receive a removal of the out of office status that the user previously indicated on an email application, the email application using a communications network; and
      program instructions in response to receiving the available status of the user, delivering the outstanding email to the email application based on the outstanding email assigned quota status and assigned priority.

* * * * *